(12) United States Patent
Park

(10) Patent No.: US 6,359,682 B1
(45) Date of Patent: Mar. 19, 2002

(54) FLUID FLOW VELOCITY MEASURING SYSTEM FOR INTERNAL COMBUSTION ENGINE

(75) Inventor: Sang-Bong Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/640,469

(22) Filed: Aug. 16, 2000

(30) Foreign Application Priority Data

Oct. 15, 1999 (KR) .............................................. 99-44697

(51) Int. Cl.[7] .............................. G01P 3/36; E01N 3/00; G01F 25/00; G01L 3/26; E02B 75/12
(52) U.S. Cl. ........................ 356/28.5; 60/276; 73/1.19; 73/116; 123/1 R
(58) Field of Search .......................... 356/28.5; 123/672, 123/1 R, 277, 278; 60/276; 73/1.16, 1.19, 116, 861

(56) References Cited

PUBLICATIONS

A. P. Morse et al, Transactions of the ASME, vol. 101, Jun. 1979, p. 208.*

* cited by examiner

*Primary Examiner*—Stephen C. Buczinski
(74) *Attorney, Agent, or Firm*—Christie, Parker & Hale, LLP

(57) ABSTRACT

A fluid flow velocity measuring system for an internal combustion engine including a laser Doppler velocimeter having a probe for projecting a pair of coherent laser beams and beam guiding means for guiding the laser beams into a combustion chamber. The beam guiding means is installed in a spark plug mounting hole of an engine.

8 Claims, 2 Drawing Sheets

FLUID FLOW VELOCITY MEASURING SYSTEM FOR INTERNAL COMBUSTION ENGINE

BACKGROUND OF THE INVENTION (a) Field of the Invention

The present invention relates to a fluid flow velocity measuring system, and in particular, to a fluid flow velocity measuring system using a crossed-beam laser Doppler velocimeter for measuring a flow velocity at a blind spot inside a combustion chamber.

(b) Description of the Related Art

A laser Doppler velocimeter (LDV) is used to measure a fluid flow, either liquid or gas. The LDV is employed to detect flow velocity in an internal combustion engine as a result of the LDV's ability to measure the velocity in a flow field without affecting or disturbing the flow field.

FIG. 1 schematically shows a crossed-beam LDV system adapted to an internal combustion engine for detecting flow velocity in an exhaust manifold.

AN LDV system includes a laser 11 for emitting a laser beam (L) which passes through a transmitter 12. The transmitter 12 splits the beam (L) into two coherent beams having different frequencies and sends the two beams to a probe 14 via a dual-mode fiber optic 13. The probe 14 projects the two coherent laser beams, and the laser beams are caused to intersect at a predetermined point in a flow field of an exhaust manifold 20. The two beams produce a fringe pattern at this point of intersection. Particles 15 passing through this fringe pattern produce periodic variations in the amount of light scattered as the particles 15 pass through the light and dark crests of the fringe pattern. The scattered light from the fringe pattern is collected by photosensitive means (not shown) and the photosensitive means then generates electrical signals representing fluid velocity components.

Accordingly, the LDV provides a means of measuring fluid velocity without requiring the insertion of probes into the flow field. However, this prior art LDV system can not measure a fluid flow velocity around a valve seat in the combustion chamber because it is impossible to project a laser beam into the combustion chamber from the outside.

SUMMARY OF THE INVENTION

The present invention has been made in an effort to solve the above problems of the prior art.

It is an object of the present invention to provide to a fluid flow velocity measuring system using a crossed-beam laser Doppler velocimeter capable of measuring a flow velocity at a blind spot inside a combustion chamber, particularly around a valve seat. To achieve the above object, a fluid flow velocity measuring system for an internal combustion engine comprises a laser Doppler velocimeter having a probe for projecting a pair of coherent laser beams and beam guiding means for guiding the laser beams into a combustion chamber, the beam guiding means being installed in a spark plug mounting hole of an engine.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings. Since a crossed-beam laser Doppler velocimeter (LDV) adapted to a fluid flow velocity measuring system of the present invention is identical to the prior art LDV, its structure will not be described.

Figure 1:
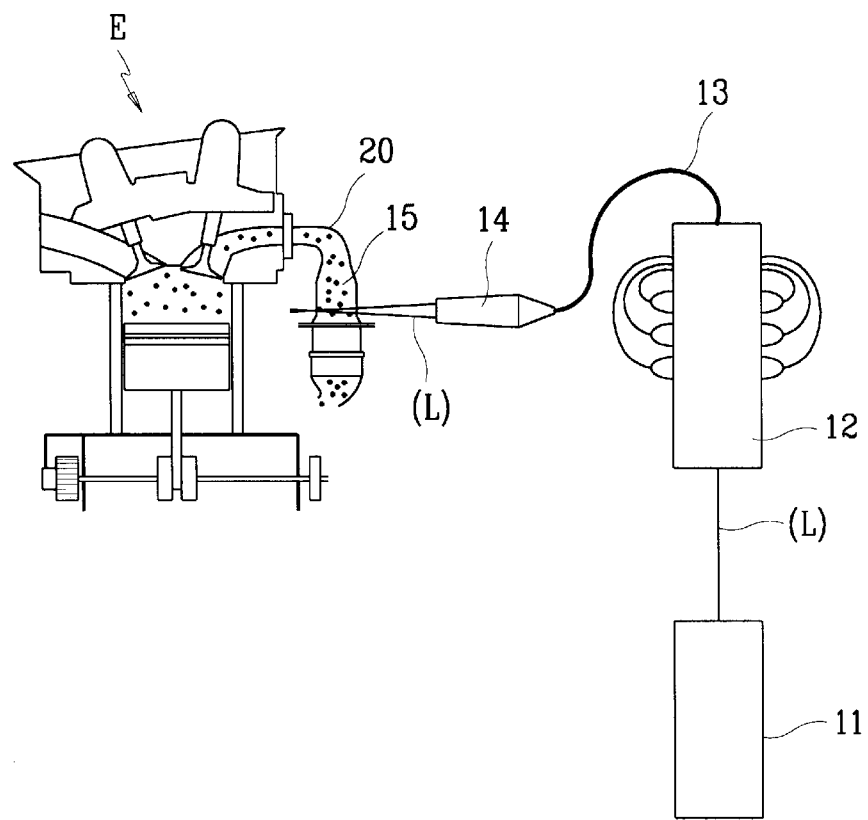
FIG. 1 is a schematic diagram showing a prior art fluid flow velocity measuring system.
Figure 2:
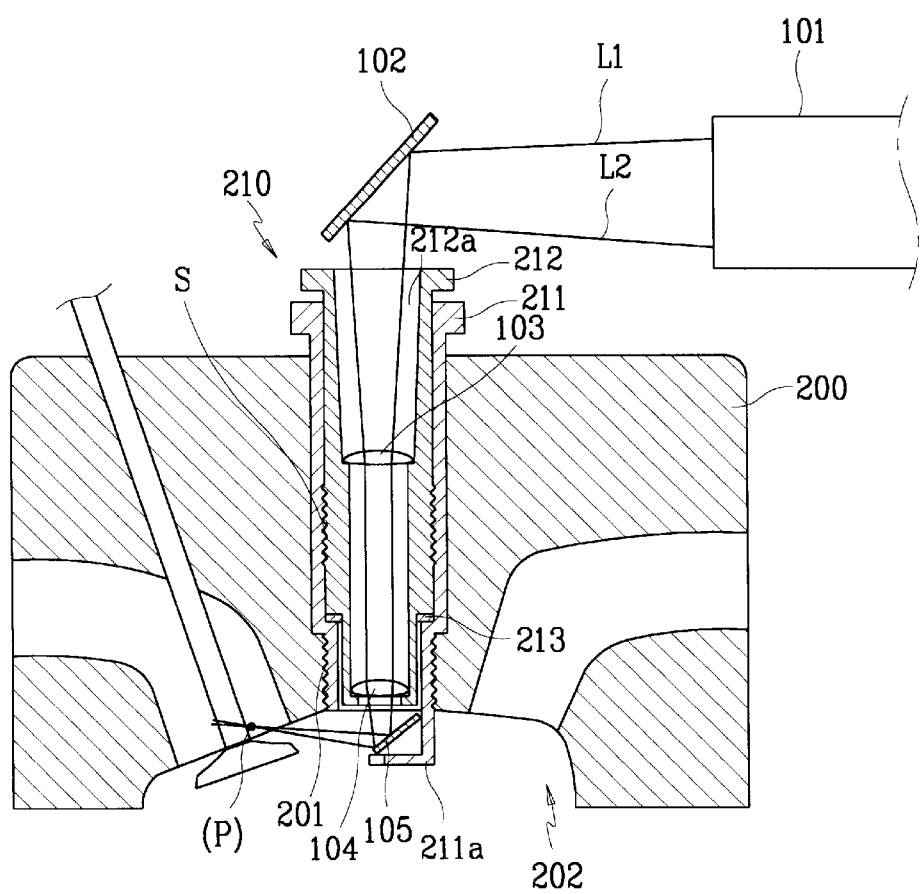
FIG. 2 is a cross-sectional view showing a fluid flow velocity measuring system according to a preferred embodiment of the present invention.

FIG. 2 is a cross-sectional view showing a fluid flow velocity measuring system according to a preferred embodiment of the present invention.

As shown in FIG. 2, the fluid flow velocity measuring system according to the preferred embodiment of the present invention comprises an LDV (not shown) having a probe 101, which is an 86 mm laser probe, for projecting coherent laser beams L1 and L2 outside a cylinder head 200; and a beam guiding means 210 installed onto the cylinder head 200 for guiding the laser beams L1 and L2 to a predetermined point in a combustion chamber 202.

The beam guiding means 210 comprises a cylindrical bracket 211 installed into a spark plug hole formed on the cylinder head 200, a lens barrel 212 fixedly inserted into the cylindrical bracket 211, and a first guide mirror 102 mounted over an upper open end of the lens barrel 212 for reflecting the laser beams L1 and L2 from the probe 101 into lens barrel 212.

The cylindrical bracket 211 is provided with a contracted portion on a lower portion thereof, the contracted portion having smaller inner and outer diameters than an upper portion of the cylindrical bracket 211; a threaded outer surface so as to be screw-fixed to the cylinder head 200; and a mirror holder 211a extended from the lower portion so as to protrude into the combustion chamber 202, the mirror holder 211a being semi-cylindrical. The mirror holder 211a holds a second mirror 105 such that the laser beams L1 and L2 reflected from the second mirror 105 are projected into the combustion chamber 202.

The lens barrel 212 is shaped identically as the cylindrical bracket 211 but with smaller dimensions to allow the lens barrel 212 to be inserted into the bracket 211. The lens barrel 212 is threaded at a middle area to be screw-fixed with the bracket 211. Around an upper end area of the lower portion of the lens barrel 212, a cushion ring 213 is mounted for preventing the lens barrel 212 from being damaged by friction with the cylindrical bracket 211. Also, the lens barrel 212 is provided with a first lens 103 disposed inside the lens barrel 212 at substantially a middle area of an upper portion of the lens barrel 212 and a second lens 104 disposed substantially at a lower open end of a lower portion of the lens barrel 212. The first and second lenses 103 and 104 are convex lenses.

The operation of the fuel flow velocity measuring system structured according to the preferred embodiment of the present invention will now be described.

First, the probe 101 projects the two coherent laser beams L1 and L2 onto the first mirror 102 such that the laser beams L1 and L2 are reflected at a perpendicular angles in a downward direction. Since the two laser beams L1 and L2 are set to cross at a predetermined point, the first mirror 102 should be located at a position closer to the probe 101 than to the point at which the laser beams L1 and L2 cross. Next, the reflected laser beams L1 and L2 continue to travel through the lens barrel 212 to eventually land on the second mirror 105. While traveling through the lens barrel 212, the laser beams L1 and L2 are bent to be in parallel by passing through the first lens 103, then are converged at a predetermined angle by passing through the second lens 104. Subsequently, the laser beams L1 and L2 passed through the second lens 104 are reflected at a perpendicular angle by the second mirror 105 to be projected to a cross point (p) in the combustion chamber 202. As shown in FIG. 2, the cross point (p) is generated at a portion around a valve seat so as to produce a fringe pattern at this point. Accordingly, particles of fluid flowing through the cross point (p) scatter light from the fringe pattern. The scattered light from the fringe pattern is collected in inverse order by a photosensitive means (not shown), and the photosensitive means generates electrical signals representing fluid velocity components.

The point at which the laser beams L1 and L2 converge can be changed by adjusting the lens barrel 212 such that it is possible to precisely detect a fluid velocity at various specific points around the valve seat.

As described above, in the fluid flow velocity measuring system, the point of convergence of the laser beams can be set at various positions around the valve seat by manipulating the projection of the two laser beams projected from the probe into the combustion chamber using the lenses and mirrors such that it is possible to detect a fluid velocity at various specific points around the valve seat.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A fluid flow velocity measuring system for an internal combustion engine comprising:

a laser doppler velocimeter having a probe for projecting a pair of coherent laser beams; and beam guiding means for guiding the laser beams into a combustion chamber, the beam guiding means being installed in a spark plug mounting hole of an engine.

2. A fluid flow velocity measuring system of claim 1 wherein the beam guiding means comprises:

a cylindrical bracket mounted in the spark plug hole of the engine;

a lens barrel fixedly inserted into the cylindrical bracket for guiding the laser beams; and a first mirror for reflecting the laser beams from the probe into the lens barrel, the first mirror being mounted over an upper opening of the lens barrel.

3. A fluid flow velocity measuring system of claim 2 wherein the cylindrical bracket is provided with a contracted lower portion having a smaller diameter than an upper portion of the cylindrical bracket.

4. A fluid flow velocity measuring system of claim 3 wherein the contracted lower portion is threaded on an outer surface thereof so as to be screw-fixed to the spark plug hole.

5. A fluid flow velocity measuring system of claim 3 wherein the cylindrical bracket further comprises a mirror holder downwardly extended from the contracted lower portion into the combustion chamber, the mirror holder containing a mirror and providing an opening through which the laser beams are projected into the combustion chamber after being reflected from the mirror.

6. A fluid flow velocity measuring system of claim 2 wherein the lens barrel comprises:

a first lens for bending the laser beams orientated into the lens barrel to be in parallel, the first lens being installed in a middle area of the lens barrel; and a second lens for converging the laser beams passed through the first lens to a point where the laser beams cross, the second lens being installed in a lower end of the lens barrel.

7. A fluid flow velocity measuring system of claim 6 wherein the barrel is provided with a threaded portion around an outer surface to enable the barrel to be fixed to the cylindrical bracket.

8. A fluid flow velocity measuring system of claim 2 wherein the lens barrel is provided with a cushion ring mounted around an upper end of the contracted lower portion for preventing the lens barrel from being damaged by friction with the cylindrical bracket.

* * * * *